United States Patent [19]

Krim

[11] 4,282,688
[45] Aug. 11, 1981

[54] ADJUSTABLE CTE GRAPHITE-EPOXY BAR

[75] Inventor: Michael K. Krim, Trumbull, Conn.

[73] Assignee: The Perkin-Elmer Corporation, Norwalk, Conn.

[21] Appl. No.: 54,732

[22] Filed: Jul. 5, 1979

[51] Int. Cl.³ .............................................. E04H 9/00
[52] U.S. Cl. .................................... 52/1; 52/573; 52/741; 52/648; 350/253; 248/DIG. 1
[58] Field of Search .................... 52/1, 573, 741, 648; 350/253; 248/DIG. 1; 33/DIG. 19, 125 T

[56] References Cited

U.S. PATENT DOCUMENTS

| 3,077,958 | 2/1963 | Grimsey, Jr. ........................ 52/573 X |
| 3,201,076 | 8/1965 | Deleuze ............................. 52/573 X |
| 3,528,206 | 9/1970 | Baird ...................................... 52/1 |
| 3,675,376 | 7/1972 | Belew ..................................... 52/1 |
| 4,074,473 | 2/1978 | Nelson .................................... 52/1 |

*Primary Examiner*—Carl D. Friedman
*Attorney, Agent, or Firm*—S. A. Giarratana; E. T. Grimes; T. P. Murphy

[57] ABSTRACT

A structural element and method of fabricating a structural element having a zero expansion in a given direction. A bar member having left and right hand sections of positive and negative coefficients of thermal expansion is tuned so that expansion of one section is exactly offset by contraction of the other section in a varying temperature environments.

13 Claims, 3 Drawing Figures

ADJUSTABLE CTE GRAPHITE-EPOXY BAR

BACKGROUND OF THE INVENTION

All materials change dimension with enviromental temperature changes in accordance with their individual coefficients of thermal expansion. Thus, in various constructions this phenomena of contraction and expansion must be compensated for to a degree acceptable for the particular construction undertaken.

Familiar examples of this compensation are seen every day in the construction of highways where room for expansion is provided between lengths of pavement and in bridge or building construction where room for expansion is provided between structural elements such as metal bars and struts. Changes in dimension of other materials such as concrete, plastic and other building compositions also must to some extent be taken into account.

In some instances, for example, in precision structures, thermal expansion or contraction must be compensated for within the individual structural elements, themselves. Precision structures such as optical instruments where precise positioning between optical elements must be unaffected by dimensional changes due to temperature variations require structural members such as struts which have zero or near zero expansivity.

The attainment of a zero, near-zero or a specific finite expansivity in a graphite-epoxy structural member is a function of a multitude of design, material and process variables. These variables include such things as the raw material used and their elastic and thermoelastic properties, epoxy bleed-rate and final percentage of epoxy present after curing, layup geometry and curing pressure, temperature and rheology. As a consequence of these factors, the attained expansivities generally exhibit scatter on a part to part basis of the order of $\pm 0.05 \times 10^{-6}$ in/in/F°. Such an expansivity factor is not acceptable in structures such as large telescope structures where the effective coefficient of thermal expansion tolerable can often be no more than $\pm 0.01 \times 10^{-6}$ in/in/F°. To accomodate this requirement the elements comprising the above structures must be made in a way that all the process variables are compensated for.

SUMMARY OF THE INVENTION

The present invention comprises a structural element such as an uniaxially loaded bar member or strut comprised of sections having different coefficients of thermal expansion such that expansion of one section is offset by contraction of the other section along their axes. The structural member is composed of laminates of graphite-epoxy composites where the coefficient of thermal expansion (positive or negative or two different positive values, for example, if the desired expansivity is a positive finite quantity, which straddle the desired value,) of the laminate is a function of the laminate design and manufacturing process. The difference in expansivity between sections of the structural member is achieved either by different wrap angle on either side of the transition zone between sections or the number of layers in each section may be made to differ.

In fabricating such a strut an oversize member having different expansivities in the left and right hand sections is cured and a piece from the end of each section is removed for measurement of its coefficient of thermal expansion. For a given overall length and specific expansivity of the strut the required length of one section is determined in accordance with a predetermined relationship and is shortened to that length. The desired overall length is obtained by measuring back from the cut of the one section. Then the excess length of the second section is cut off. The resultant strut will then have the desired length and expansivity.

DESCRIPTION OF THE INVENTION

Figure 1:
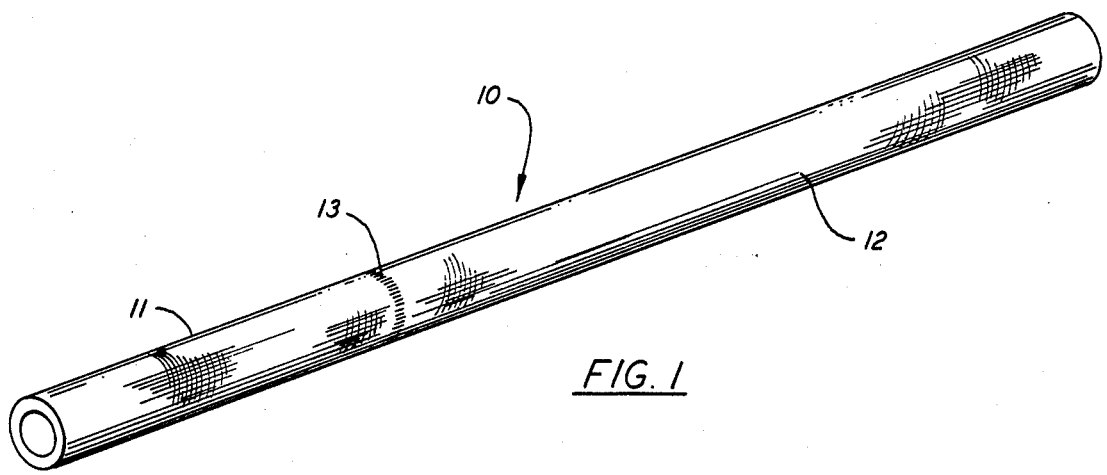
FIG. 1 is an isometric view of a strut illustrative of the present invention.

FIG. 1 shows a structural element in the form of a strut 10. The strut 10 is formed in two sections 11 and 12 which are formed by a series of layers of a graphite-epoxy composite. Each section 11 or 12 has a different coefficient of thermal expansion.

The different coefficients of thermal expansion is achieved by different laminate i.e. layup geometry in the sections 11 and 12. These differences in expansivities in the left section 11 and the right section 12 may be obtained by changing the wrap angle of the laminate at the transition zone 13. Similarly the number of layers in each of the sections between transition zone 13 may be made different to achieve the difference in expansivity. It has been found that an angular difference of five degrees in the wrap angles of the sections 11 and 12 can change the expansivity of $0.2 \times 10^{-6}$ in/in/F°.

Each section 11 and 12 would ideally be wrapped so that each has an equal and opposite coefficient of thermal expansion e.g. section 11 might be designed so that its expansivity is $$ {+\,0 \atop -\,0.1} \times 10^{-6} \text{ in/in/F.°} $$

and section 12 would have a coefficient of thermal expansion of $$ {+\,0.1 \atop 0\,-\,0} \times 10^{-6} \text{ in/in/F.°}. $$

A net thermal expansion of zero is achieved if sections 11 and 12 can be made proportional such that $$ \alpha_{11} L_{11} + \alpha_{12}{}^l L_{12} = 0 $$

where
$\alpha_{11}$ = coefficient of thermal expansion of section 11.
$L_{11}$ = length of section 11
$\alpha_{12}$ = coefficient of thermal expansion of section 12.
$L_{12}$ = length of section 12.

A net thermal expansion of some finite value other than zero may be achieved by setting the above equation to a value other than zero.

As may be deduced the coefficients of thermal expansion need not be precise just as long as they are known since the lengths $L_{11}$ and $L_{12}$ are variable and can be changed to accomodate the foregoing equation. This relieves the necessity of precise wrapping and angling of the laminate in each of the sections 11 and 12.

Figure 2:
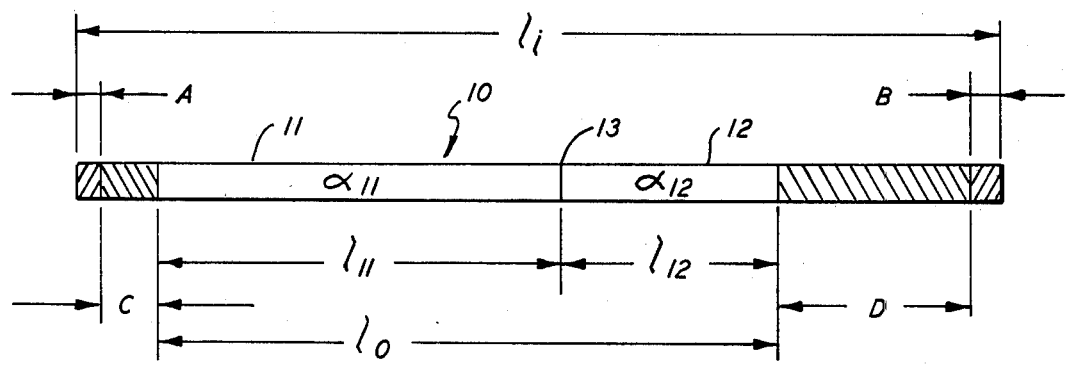
FIG. 2 is a view of the strut useful in explaining the method of fabrication.

The method of fabrication of zero overall expansivity is hereinafter described with reference to FIG. 2.

The strut 10 is constructed e.g. by wrapping laminate of graphite-epoxy composite around a form which is later removed with sections 11 and 12 designed to have different coefficients of thermal expansion as discussed above.

The strut 10 is originally made to have a length $L_1$ longer than desired length $L_O$. This permits the tuning process to be described to be carried out.

After curing at a predetermined temperatue short pieces A and B are removed from sections 11 and 12 respectively. The coefficients of thermal expansion of pieces A and B are then measured for example, by a Fizeau interferometer. This ascertains the coefficients of thermal expansion $\alpha_{11}$ and $\alpha_{12}$ of sections 11 and 12.

Since expansivity of desired length $L_o$ is given by $$\alpha_o = \frac{L_{11}\alpha_{11} + L_{12}\alpha_{12}}{L_o} \text{ and}$$
$$L_{11} = L_o - L_{12}$$
$$\alpha_o = \frac{(L_o - L_{12})\alpha_{11} + L_{12}\alpha_{12}}{L_o}$$

For the case $\alpha_o = 0$ $$L_o \alpha_{11} - L_{12}\alpha_{11} + L_{12}\alpha_{12} = 0$$
or
$$L_{12} = \frac{\alpha_{11}}{\alpha_{11} - \alpha_{12}} L_o$$

where $\alpha_{11}$ and $\alpha_{12}$ have been determined by measurement.

The distance $L_{12}$ as calculated by the above equation is measured off from transistion zone 13 and the length D cut off from the end of section 12. The known distance $L_o$ is then measured back from the cut end of section 12 and length C is cut off.

The resultant strut 10 of the above described tuning technique will have the required $L_o$ and expansivity $\alpha_o$ desired.

As should be clear expansivity $\alpha_o$ could be set at some other specific value other than zero if desired in which case the strut 10 would expand or contract to the specific value selected.

The tolerance of $\alpha_o$ is a function of the accuracy with which $\alpha_{11}$ and $\alpha_{12}$ are measured and with which transition zone 13 is located. Final verification of the strut 10 may be obtained by measuring the expansivity $\alpha_o$ over the length $L_o$ with a dilatometer.

Struts made in accordance with the foregoing described fabrication method fine use in trusses for supporting and maintaining precise spatial relationships between elements where fixed distances between the elements is critical. For example, in optical support trusses for large telescope structures it is important that the optical elements such as mirror and lens remain fixed relative to each other over a wide range of temperature levels and distributions.

Figure 3:
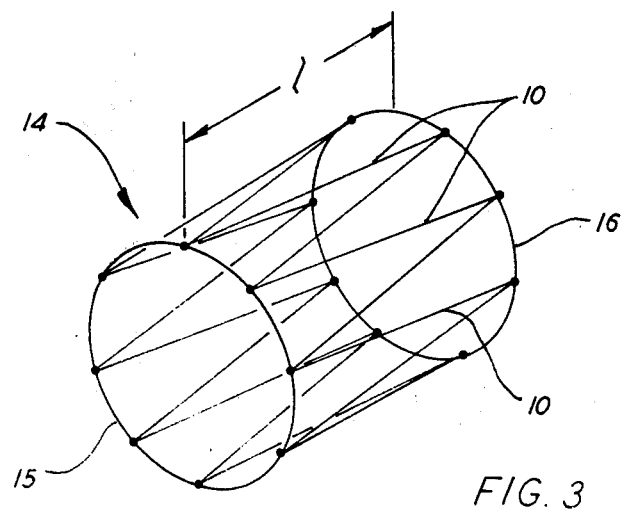
FIG. 3 is any isometric view of an optical support truss constructed with struts as depicted in FIG. 1.

Referring to FIG. 3 there is shown a cylindrical truss 14. The truss 14 comprises a plurality of struts 10 which are arranged as triangles with rings 15 and 16 forming the bases thereof. One or more trusses similar to truss 14 may be joined end to end with the ends of struts secured to rings similar to rings 14 and 15. Depending on desired lengths of optical paths optical elements e.g. mirrors and lenses may be fixed to the ends of the struts 10 in place of or in addition to the rings.

The struts 10 are arranged within the truss 14 with alternative positive and negative ends i.e. sections 11 and 12 alternately reversed. This structure compensates for a temperature distribution change e.g. a temperature gradient along the axis of the truss 14. Thus, if the temperature varies between the left and right halves overall expansivity of the truss will be the same as that of each individual strut. Temperature variation in the radial direction also will not change expansivity for which the strut were tuned since each strut is subjected to the same temperature change.

The method of fabrication and tuning described hereinabove while described in relation to straight members is also applicable to curved elements such as rings 15 and 16 of FIG. 3. Thus, the entire truss 14 may be tuned to have an ensemble coefficient of thermal expansion of zero.

Other modification of the present invention are possible in light of the above description which should not be construed as placing limitations on the invention beyond those limitations in the claims which follow:

What is claimed is:

1. A structural element having a specific overall expansivity along a given axis, comprising in combination;
   a member comprising first and second sections integrally formed therewith,
   said member comprising a plurality of layers of graphite epoxy composite,
   each of said sections having a length and coefficient of thermal expansion such that overall expansion or contraction is zero and wherein,
   the layers in said first section have different wrap angles from the layers in said second section.

2. A structural element according to claim 1 wherein the number of layers in said first and second sections are different.

3. A structural element according to claim 1 wherein, the length of said first and second sections may be determined by the equation $$L_2 = \frac{\alpha_1}{\alpha_1 - \alpha_2} L_o$$

where
   $L_s$ = length of one of said sections
   $L_o$ = desired length of said member
   $\alpha_1$ = coefficients of thermal expansion of the other of said sections
   $\alpha_2$ = coefficient of thermal expansion of said one of said sections.

4. A method for fabricating a structural element comprising the steps of
   forming a member having a first section with a negative coefficient of thermal expansion and a second section having a positive coefficient of thermal expansion,
   measuring the coefficient of thermal expansion of portions of said first and second sections,
   calculating the necessary length of one of said sections to give a desired expansivity for a given length of the member,
   cutting off a portion of said one of said sections to shorten it to the required length,
   cutting off a portion of the other of said sections to cause said member to conform to said given length.

5. A method according to claim 4 wherein said step of forming includes the step of determining the transition point of the member at which the coefficients of thermal expansion change.

6. A method according to claim 5 wherein said step of measuring is preceded by a step of heat curing said structural element.

7. A method according to claim 6 wherein the step of measuring includes the steps of
cutting small portions from the ends of each section and
determining the coefficient of thermal expansion of each by a Fizean interferometer.

8. A method according to claim 7 wherein the step of calculating includes the step of,
solving the equation $$L_2 = \frac{\alpha_1}{\alpha_1 - \alpha_2} L_o$$

where
$L_2$ = length of one of said second sections
$L_o$ = desired length of said member
$\alpha_1$ = coefficient of thermal expansion of said first section
$\alpha_2$ = coefficient of thermal expansion of said second sections.

9. A method according to claim 8 wherein the steps of cutting include,
measuring the length $L_2$ from the transition zone and removing a portion of said second section to make it conform to the length $L_2$,
measuring the length $L_o$ back the cut of said second section and removing the portion of said first section to make the member conform to the length $L_o$.

10. A truss, comprising in combination,
a plurality of struts
each of said struts composed of first and second sections having a length and coefficient of thermal expansion such that overall expansion or contraction of the strut due to temperature variations is zero,
first and second rings,
each of said struts having an end fixed to each of said rings,
each of said first and second rings connected to alternate ends of said first and second sections of said struts.

11. A truss according to claim 10 wherein each pair of struts form a triangle with one of said rings.

12. A truss according to claim 11 wherein, the length of said first and second sections may be determined by the equation $$L_2 = (\alpha_1/\alpha_1\alpha_2)L_o$$

where
$L_2$ = length of one of said sections
$L_o$ = desired length of a strut
$\alpha_1$ = coefficient of thermal expansion of the other of said sections
$\alpha_2$ = coefficient of thermal expansion of said one of said sections.

13. A structural element having a specific overall expansivity along a given axis, comprising in combination;
a member comprising first and second sections integrally formed therewith,
said member comprising a plurality of layers of graphite epoxy composite,
each of said sections having a length and coefficient of thermal expansion such that overall expansion on contraction has a predetermined value wherein the number of layers in said first and second sections are different.

* * * * *

UNITED STATES PATENT AND TRADEMARK OFFICE
CERTIFICATE OF CORRECTION

PATENT NO. : 4,282,688
DATED : August 11, 1981
INVENTOR(S) : Michael K. Krim

It is certified that error appears in the above—identified patent and that said Letters Patent is hereby corrected as shown below:

Column 3, line 9, "temperatue" should read -- temperature --.

Column 6, line 16, "$L_2=(a_1/a_1a_2)L_0$" should read $$-- L_2 = \frac{a_1}{a_1 - a_2} L_0 --$$

Signed and Sealed this

Sixteenth Day of March 1982

[SEAL]

Attest:

GERALD J. MOSSINGHOFF

Attesting Officer

Commissioner of Patents and Trademarks